United States Patent
Almubarak

(10) Patent No.: US 12,221,580 B1
(45) Date of Patent: Feb. 11, 2025

(54) DUAL-POLYMER HYDRAULIC FRACTURING FLUID AND METHOD FOR PUMPING THE SAME INTO SUBTERRANEAN FORMATIONS

(71) Applicant: SAUDI ARABIAN OIL COMPANY, Dhahran (SA)

(72) Inventor: Tariq Abdulsattar Almubarak, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/471,499

(22) Filed: Sep. 21, 2023

(51) Int. Cl.
  *E21B 43/27* (2006.01)
  *C09K 8/62* (2006.01)
  *E21B 43/267* (2006.01)

(52) U.S. Cl.
  CPC .............. *C09K 8/62* (2013.01); *E21B 43/267* (2013.01); *E21B 43/27* (2020.05)

(58) Field of Classification Search
  CPC .......... C09K 8/62; E21B 43/27; E21B 43/267
  See application file for complete search history.

(56) References Cited

U.S. PATENT DOCUMENTS

| | | | |
|---|---|---|---|
| 6,359,040 B1 | 3/2002 | Burdick | |
| 7,798,224 B2 | 9/2010 | Huang et al. | |
| 7,857,055 B2 | 12/2010 | Li | |
| 9,783,628 B2 | 10/2017 | McCarthy et al. | |
| 2012/0252707 A1 | 10/2012 | Li et al. | |
| 2014/0352969 A1* | 12/2014 | Chung | C09K 8/882 166/305.1 |
| 2017/0037302 A1* | 2/2017 | Liang | C09K 8/882 |
| 2018/0230784 A1* | 8/2018 | Rodriguez Herrera | E21B 41/00 |
| 2018/0252102 A1* | 9/2018 | Anschutz | E21B 49/086 |
| 2022/0017813 A1* | 1/2022 | Malik | C09K 8/703 |
| 2022/0056332 A1* | 2/2022 | Liang | C09K 8/685 |

OTHER PUBLICATIONS

Koichi Mayumi, Jingyi Guo, Tetsuharu Narita, Chung Yuen Hui, Costantino Creton, Fracture of dual crosslink gels with permanent and transient crosslinks, Extreme Mechanics Letters, vol. 6, 2016, pp. 52-59.

(Continued)

*Primary Examiner* — Silvana C Runyan
(74) *Attorney, Agent, or Firm* — Vorys, Sater, Seymour and Pease, LLP

(57) ABSTRACT

Methods for hydraulic fracturing may utilize a fracturing fluid that includes a dual-polymer base fluid for all stages of a hydraulic fracturing operation. The dual-polymer base fluid includes a polysaccharide polymer and a polyacrylamide polymer. The dual-polymer base fluid and a crosslinker may be pumped into a wellbore drilled into a formation. A pump rate may be increased to induce one or more fractures in the formation. Proppant may be added to the dual-polymer base fluid while pumping. The proppant may be injected into the one or more fractures. The pump rate may then be reduced, and the dual-polymer base fluid may flow back into the wellbore.

11 Claims, 10 Drawing Sheets

(56) References Cited

OTHER PUBLICATIONS

Doyoung Jung, Kyoung Min Lee, Tomohiro Tojo, Yuree Oh, Hyeonseok Yoon, and Hyungwoo Kim, Dual Cross-Linked Hydrogels That Undergo Structural Transformation via Selective Triggered Depolymerization, Chemistry of Materials 2019 31 (16), 6249-6256.

Almubarak, Tariq, Ng, Jun Hong, Sokhanvarian, Khatere, Khaldi, Mohammed, and Hisham A. Nasr-El-Din. "Development of a Mixed Polymer Hydraulic Fracturing Fluid for High Temperature Applications." Paper presented at the SPE/AAPG/SEG Unconventional Resources Technology Conference, Houston, Texas, USA, Jul. 2018.

* cited by examiner

DUAL-POLYMER HYDRAULIC FRACTURING FLUID AND METHOD FOR PUMPING THE SAME INTO SUBTERRANEAN FORMATIONS

FIELD OF THE DISCLOSURE

The present disclosure relates generally to fracturing fluid compositions and methods of using the same, that create efficient fracturing operations and, more particularly, to the use of a dual-polymer hydraulic fracturing fluid system.

BACKGROUND OF THE DISCLOSURE

Hydraulic fracturing is a commonly utilized wellbore stimulation method, during which fluids are pumped into a wellbore at high pressures and high flow rates to enhance permeability, and thus production, of subterranean hydrocarbon formations. Generally, hydraulic fracturing is carried out in a multistep/multistage process in which each stage includes the pumping of a discrete fluid. In most cases, a minifrac fluid is pumped initially to test injectivity and measure fracture breakdown pressures. This minifrac fluid often contains a polymeric component such as an uncrosslinked polyacrylamide-based friction reducer. Following this minifrac fluid (also known as a slickwater fluid), a thicker crosslinked fluid that contains a second different polymer is pumped into the wellbore at a high pressure designed to break the rocks open (increase rock permeability) and carry large quantities of proppant sand downhole. The minifrac fluid is usually Newtonian in nature and the subsequent fluids are non-Newtonian, having higher viscosity and capacity to carry proppant. Often, such processes require large volumes of several distinct fluids that must be kept separate on a rig site, which means two tanks and two separate pumping operations. Similarly, as the name implies, a multistage fracture process often requires numerous procedural steps and stages, all of which necessitate additional rig time and cost.

Hydraulic fracturing operations that use fewer fluids, less equipment and reduce rig time and cost, are highly advantageous.

SUMMARY OF THE DISCLOSURE

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a fracturing fluid may include a dual-polymer fluid operable as a base fluid for all stages of a hydraulic fracturing operation that may comprise a polysaccharide polymer and a polyacrylamide polymer.

According to another embodiment consistent with the present disclosure, a method of hydraulic fracturing may include preparing a dual-polymer fluid wherein the dual-polymer fluid may include a polysaccharide polymer and a polyacrylamide polymer. The method may also include pumping the dual-polymer fluid into a wellbore drilled that has been into a formation and operable to receive a hydraulic fracturing treatment. The method of hydraulic fracturing may also include adding crosslinker to the dual-polymer fluid while simultaneously pumping the dual-polymer fluid into the wellbore at a set pump rate, then increasing the pump rate, thereby inducing one or more fractures in the formation and then adding proppant to the dual-polymer fluid while simultaneously pumping the dual-polymer fluid into the wellbore. The method may also include injecting the proppant into the one or more fractures, reducing the pump rate and finally, flowing the dual-polymer fluid back into the wellbore.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
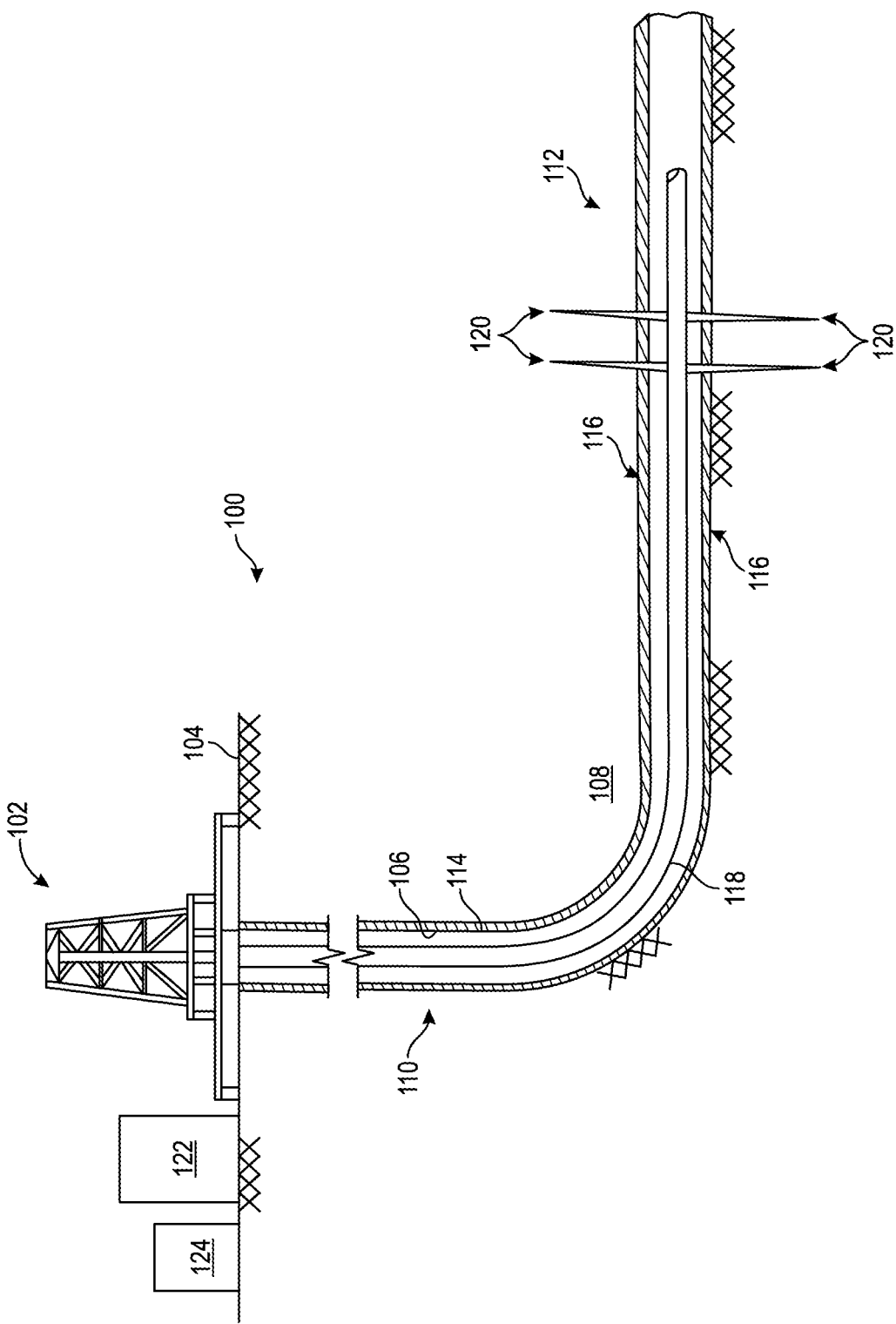
FIG. 1 is an example well system that may embody or otherwise employ one or more principles of the present disclosure, according to one or more embodiments.

The present disclosure relates generally to fracturing fluid compositions and methods of using same that create efficient fracturing operations and, more particularly, to the use of a dual-polymer hydraulic fracturing fluid system.

Embodiments in accordance with the present disclosure generally relate to the composition of a fracturing fluid and more particularly, to the use of a single base fluid comprising two different polymers, to perform a hydraulic fracturing operation. The polymer combination has rheological synergy in both the linear fluid stage (uncrosslinked) and the crosslinked stage, as compared to an individual polymer system. This synergism creates an optimal fracturing fluid with which to carry out all stages of a multistage hydraulic fracturing operation. Accordingly, the base fluid disclosed herein may be used in the first stage of a hydraulic fracturing operation to acquire information operable to test the breakdown pressure of the formation and refine the design of the subsequent fracturing (treatment) stage(s) that follow. The fluid is equally suitable to serve as the base fluid to carry out the treatment stage(s) to which additives, proppant, sand and any combination thereof, may be added on-the-fly as determined by the operator. The dual-polymer base fluid disclosed herein is advantageous in that utilization of a single base fluid eliminates the need to prepare multiple discrete base fluids for each stage of the operation. Such a change results in a reduction of equipment, mixing, and pumping time and an increase in procedural efficiency. Both of which may reduce operational time and cost.

The fracturing fluids of the present invention comprises a two polymer system that includes a first polymer, which comprises a polyacrylamide polymer, and a second polymer, comprising a polysaccharide polymer. These polymers, when used together in accordance with the present disclosure, provide a synergistic rheological effect that enables the fracturing fluid to be used in any stage of a fracturing operation, including the minifrac stage and the crosslinked stage.

Suitable polyacrylamide polymers should have a molecular weight of about 5 million to about 20 million Dalton and should include at least one of the following monomers: acrylamide (AM), acrylic acid (AA), and 2-acrylamido-2-methylpropane sulfonic acid (AMPS), and similar monomers capable of hydrogen bonding. Polymers that include any combinations of one or more of these monomers may also be suitable. In a preferred embodiment of the present disclosure, a suitable polyacrylamide polymer will have the following concentration: about 0.5 wt. % to 2 wt. % AA, and about 10 to 30 wt. % AMPS with the remaining being AM. The polyacrylamide may comprise a molecular weight between 5-20 million Dalton (MDa) (alternatively referred to a "megadalton") as compositionally required. At least one example of a suitable polyacrylamide polymer is SNF® FLOPAAM DP/EM 5015 available from SNF® headquartered in France or at www.snf.com. In certain embodiments of the fracturing fluids presented in this disclosure, the polyacrylamide polymer should be present in an amount of about 0.05 vol. % to 3 vol. % or 0.5 to 30 gpt (from the 30 wt. % active concentration of polyacrylamide polymer).

Suitable polysaccharide polymers that can be used in the fracturing fluids of this disclosure can include carboxymethyl hydroxyl propyl guar (CMHPG), hydroxyl propyl guar (HPG), guar, any polysaccharide derivative wherein the derivative has six or more repeating units (i.e., saccharide radicals attached to each other by glycosidic linkages), or any polysaccharide containing side groups capable of hydrogen bonding. The concentration of the polysaccharide in the fracturing fluids of the present disclosure should be at a concentration of about 0.05% to about 1 wt. % by weight.

In an example of a preferred embodiment of the fracturing fluids of the present disclosure, the preferred total concentration of the first polymer and second polymer together is about 0.48 wt. % by weight at a volume ratios of polysaccharide to polyacrylamide of about 1:1, about 1:2, to about 2:1.

Like other hydraulic fracturing fluids (crosslinked or otherwise) additives may be included in the dual-polymer base fluid. Using additives may be beneficial to the overall performance of the fluid and the hydraulic fracturing operation. Alternatively, additives may be necessary based upon the characteristics of the formation in which the base fluid is deployed.

Given the often extreme temperatures that a wellbore stimulation fluid may be exposed to, the ability of the base fluid to retain its properties when exposed to such temperatures is critical. As such, in at least one embodiment, to improve the thermal stability of the base fluid (more specifically the thermal stability of the polysaccharide) adjustments to the pH may be made via the addition of a buffer. When added to the base fluid before pumping, buffers are capable of adjusting the pH of the fluid and thus are instrumental in helping to achieve a thermally stable fluid with more predictable performance characteristics. Accordingly, as observed in some of the Experiments disclosed below, sodium acetate or an acetic acid buffer may be added to the base fluid to adjust the pH within a range of 4 to 6. Test results indicate that the most preferable pH range is between 4.5 and 5.5.

Additionally, a clay stabilizer may be added to the base fluid. The clay stabilizer additive may be effective in preventing clay swelling within the formation that may result from exposing the clay particles within the formation to a water-based fluid. Clay formation and/or swelling within the formation may reduce the permeability of the reservoir and thus, result in a reduction of hydrocarbon production. As such, the addition of a clay stabilizer within the base fluid is advantageous. Examples of clay stabilizers include but are not limited to tetramethyl ammonium chloride (TMAC) and potassium chloride (KCl). Examples disclosed herein utilize TMAC.

A surfactant may also to be added to the base fluid. A surfactant may reduce the surface tension, or interfacial tension, between fluids or between a fluid and a solid. The addition of a surfactant assists in the flow back operations that may follow the fracture treatment. Those of ordinary skill will be familiar with the occurrence of fluid flow back following hydraulic fracturing treatment. Flow back occurs when hydrocarbons and/or some portion of the treatment fluid, may be allowed to flow back into the wellbore from the formation 108 (FIG. 1). This operation often occurs either in preparation for another treatment or to return the wellbore 106 (FIG. 1) to production. An example of a potential surfactant is an ethoxylated alcohol such as EZEFLO F103 or F111 Surfactant produced by Schlumberger®. Test results below indicate the ideal concentration of the surfactant to be added to the base fluid is between 0.05 to 1 vol. %.

It is important to note that the pH of the fracturing fluid may need to be adjusted prior to being pumped into a well. The preferred pH range for the fluid is about 4 to about 6, with a particularly preferred range of 4.5 to 5.5. The preferred ranges may vary depending on the conditions at the wellbore. A suitable pH buffer may be added to the fluid in order to achieve the desirable pH range and will be readily apparent to those skilled in the art.

When being pumped downhole, a suitable crosslinker (also known as a crosslinking agent) may be added to the fluid on-the-fly to crosslink the fluid thereby increasing the viscosity of the fluid. An increase in viscosity should increase the fluid's ability to carry particulate matter such as proppant, downhole. Suitable crosslinkers include metallic crosslinkers including, but not limited to, titanium-based crosslinkers, hafnium-based crosslinkers, and zirconium-based crosslinkers. Specific examples include Zr-lactate, Zr-triethanolamine, Zr-lactate in combination with propylene glycol, and Zr-lactate in combination with triethanolamine. The concentration of crosslinker to be used in an operation according to the present disclosure is about 0.01 vol. % to about 2 vol. % by volume or 0.1 gpt to 20 gpt. In some embodiments, a preferred crosslinker may be Zr-lactate in combination with propylene glycol. A commercially available example is MAXLINK 2153 (Maxflow Oilfield Chemicals headquartered in Flemington, New Jersey). In some embodiments, MAXLINK 2153 may be used at a concentration of about 0.4 vol. % or 4 gpt.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

FIG. 1 is a schematic diagram of a well system 100 that may employ one or more principles of the present disclosure, according to one or more embodiments. As illustrated, the well system 100 may include a service rig 102 positioned on a terranean surface 104 and extending over and around a wellbore 106 that penetrates a subterranean formation 108. The service rig 102 may be a drilling rig, a completion rig, a workover rig, or the like. In some embodiments, the service rig 102 may be omitted and replaced with a standard surface wellhead completion or installation, without departing from the scope of the disclosure. Moreover, while the well system 100 is depicted as a land-based operation, it will be appreciated that the principles of the present disclosure could equally be applied in any offshore, sea-based, or sub-sea application where the service rig 102 may be a floating platform, a semi-submersible platform, or a subsurface wellhead installation as generally known in the art.

The wellbore 106 may be drilled into the subterranean formation 108 using any suitable drilling technique and may extend in a substantially vertical direction away from the terranean surface 104 over a vertical wellbore portion 110. At some point in the wellbore 106, the vertical wellbore portion 110 may deviate from vertical relative to the terranean surface 104 and transition into a substantially horizontal wellbore portion 112. In some embodiments, the wellbore 106 may be lined with one or more strings of casing 114 that may extend to the distal end of the wellbore 112 or a portion thereof. The casing 114 may be cemented in the wellbore 106 by cement 116. In some embodiments, the wellbore 106 may further include an extension of tubing 118 concentrically arranged within the interior of the casing string 114. The tubing 118 may extend beyond the distal end of the casing 114. In the alternative, the distal end of the tubing 118 may not extend beyond the distal end of the casing 114. In yet other embodiments, the casing string 114 may be omitted from all or a portion of the wellbore 106 and the principles of the present disclosure may apply only to the extension of tubing 118.

The wellbore 106 may also include at least one or more perforations 120 defined through the tubing 118, the casing 114, the cement 116, and into the formation 108. The perforations 120 result from perforating operations (not shown) performed prior to the hydraulic pumping operations. Perforating is not discussed in any detail within the present disclosure and it is assumed that one of ordinary skill in the art will be familiar with such operations.

The system 100 may further include components arranged at the terranean surface 104 operable to conduct the hydraulic pumping operations described below. In at least one embodiment, the components may include at least one or more fluid tank(s) 122 operatively coupled to the wellbore 106. More particularly, the fluid tank(s) 122 may be operatively coupled to a mode of pumping (not shown) that may include a pump truck or alternatively, rig pumps, or similar. In at least one embodiment, one or more tanks or silos 124 may also be positioned at the terranean surface 104 for bulk storage of material including additives, proppant, and the like. In another embodiment, wherein in the hydraulic pumping operations take place in an offshore, sea-based, or sub-sea application, the fluid tanks 122 and the other aforementioned terranean surface 104 equipment may be positioned on a surface of the offshore application. In yet other embodiments, an offshore hydraulic fracturing operation may require use of a fracture vessel wherein the vessel floats alongside and is operatively coupled to the offshore, sea-based, or sub-sea application.

It will be appreciated by those skilled in the art that even though FIG. 1 depicts the perforations 120 as being and in the horizontal portion 112 of the wellbore 106, the embodiments described herein are equally applicable for use in portions of the wellbore 106 that are vertical, deviated, or otherwise slanted. Moreover, use of directional terms such as above, below, upper, lower, upward, downward, uphole, downhole, and the like are used in relation to the illustrative embodiments as they are depicted in the figures, the upward or uphole direction being toward the top of the corresponding figure and the downward direction being toward the bottom of the corresponding figure, the uphole direction being toward the surface of the well and the downhole direction being toward the toe of the well. As used herein, the term "proximal" refers to that portion of the component being referred to that is closest to the wellhead, and the term "distal" refers to the portion of the component that is furthest from the wellhead.

Mentioned briefly above, wellbore stimulation methods that utilize hydraulic fracturing are typically carried out in multistage (multistep) processes. As an example, dual-stage fracturing operations often entail pumping a first fluid, usually a polyacrylamide-based friction reducing fluid that is an un-crosslinked fluid. Those of ordinary skill in the art will recognize this first operation as a "minifrac" or alternatively referred to as the "pad stage." During the minifrac, fluid is pumped into the wellbore 106 and through the perforations 120, or otherwise, with the purpose of testing the injectivity and measuring the breakdown pressure of the targeted reservoir. Typically, the first stage fluid does not contain any proppant particulates. The result of the minifrac enables the design refinement of the second stage pumping operation. In the second stage or treatment stage, a second fluid, usually a polysaccharide containing crosslinkers and entrained with large quantities of specially designed proppant and/or sand, is pumped into the wellbore 106 to further fracture (break)

the fractures initially induced during the perforating operations. The proppant-filled fluid is pumped into the wellbore 106 at high pressure and flowrates to disperse the proppant into the induced fractures. The conventional dual-stage method described requires two separate fluids, at least two fluid tanks 122, likely some number of bulk storage silos 124 and ultimately requires two pumping operations that result in significant rig time and cost.

According to embodiments of the present disclosure, a hydraulic fracturing wellbore stimulation method may be carried out with a single base fluid and thus, may comprise a single stage. To achieve a single stage operation, two discrete polymers, a polysaccharide and a polyacrylamide (i.e., a synthetic polymer) may be combined into a single fracture fluid that may be used in the both the minifrac and crosslinking stages of the fracturing operation. The fluid will be referred to hereinafter as a "dual-polymer base fluid." The disclosed dual-polymer base fluid may show an observable improvement in rheological performance (e.g., flow characteristics) as compared to stimulation fluids utilizing the respective polymers individually. Test results (discussed below) indicate, in particular, the dual-polymer base fluid is capable of achieving and maintaining the necessary viscosity to carry out a hydraulic fracturing operation. The use of the disclosed base fluid may save operational time and cost by eliminating the need to prepare a different base fluid for each discrete stage of the fracturing operation.

The following Experiments are presented to illustrate the preparation and properties of the exemplary dual-polymer base fluid disclosed herein and should not be construed to limit the scope of the invention, unless otherwise expressly indicated in the appended claims. The synthetic polymer, polyacrylamide, utilized in the following experiments specifically comprise SNF® FLOPAAM DP/EM 5015 (hereinafter referred to as "P1"). The polysaccharide utilized in the following experiments specifically comprise CMHPG (hereinafter referred to as "P2").

Experiments
Experiment 1

Figure 2:
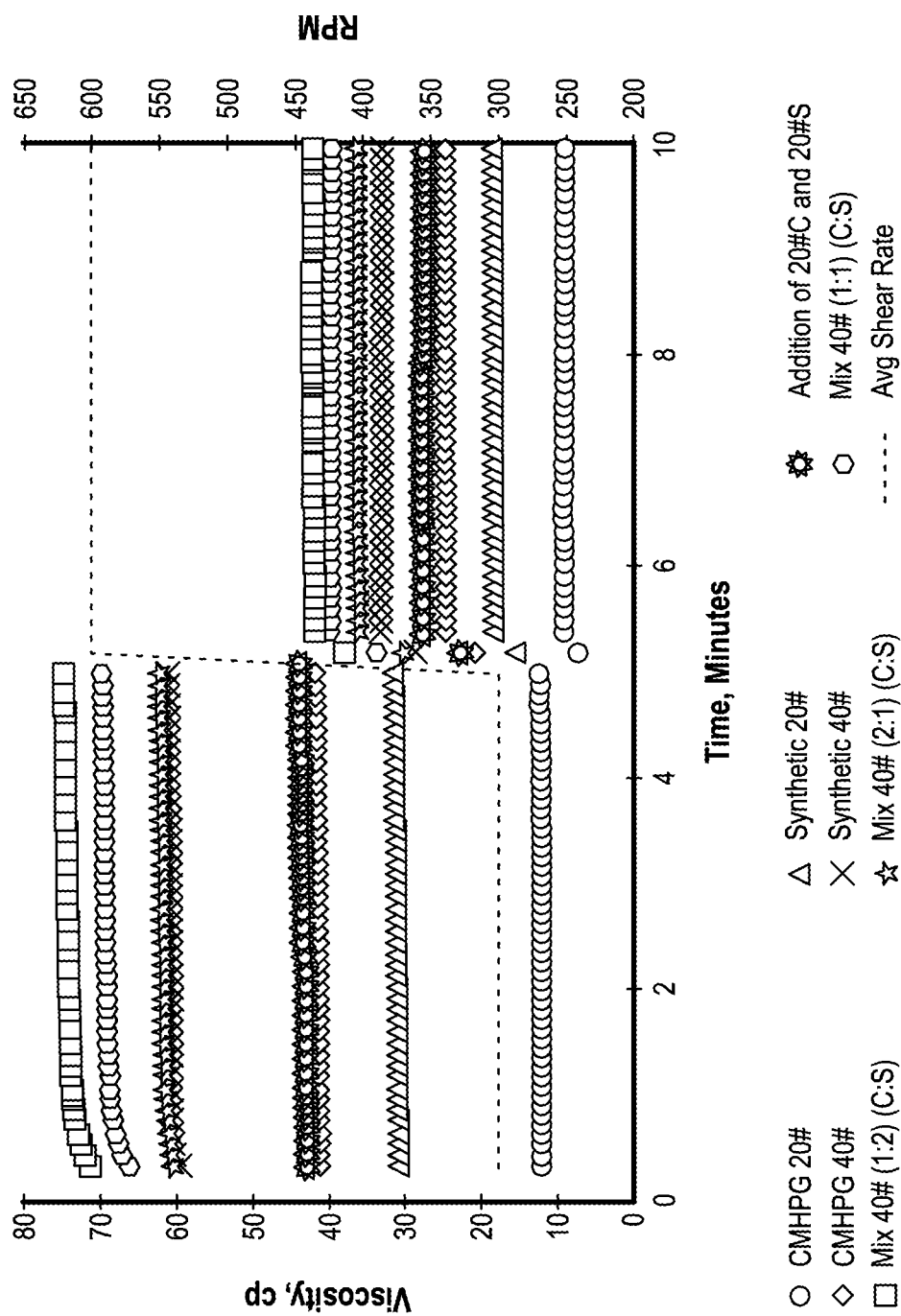
FIG. 2 is a graph depicting the viscosities of fluid mixtures, at varying volumetric ratios when subject to fluctuating rotational speeds (rpms), according to one or more embodiments.

FIG. 2 is a graph depicting the viscosities of fluids comprising single polymers and exemplary dual-polymer fluids, at varying volumetric ratios when subject to fluctuating rotational speeds (rpms) that may employ one or more principles of the present disclosure, according to one or more embodiments. None of the fluids depicted in FIG. 2 includes a crosslinker, and thus are believed to be representative of a conventional first stage fluid or minifrac fluid.

40 lb/1,000 gal of P2 was prepared by adding 4.8 g of P2 to 1,000 ml of tap water. The combination was then mixed in a blender at 800-1,000 shear rate ($s^{-1}$) for 20 minutes. The fluid is labeled as "CMHPG 40 #" in FIG. 2. 40 lb/1,000 gal of P1 was prepared by adding 16 ml to 1,000 ml (1.6 vol. % or 16 gpt) of tap water (wherein the active concentration of P1 was 30 wt. %) and mixed in a blender at 800-1,000 ($s^{-1}$) for 20 minutes. The fluid is labeled as "Synthetic 40 #" in FIG. 2. Three final solutions each comprising 250 ml were prepared by combining the P2 and P1 fluids in ratios of CMHPG to synthetic polymer (i.e., CMHPG: Synthetic polymer) by volume) of 1:1, 1:2 and 2:1, respectively, in graduated cylinders. The respective mixtures were then mixed in a blender. Once blended, 0.2 vol. % of TMAC (clay stabilizer) was added along with 0.2 vol. % of F103 (surfactant). Lastly, sodium acetate buffer was added until a pH of 5 was reached. The entirety of each solution was mixed thoroughly for 5 minutes. As illustrated in FIG. 2, the fluid compositions are labeled as "Mix 40 # 1:1, 1:2, and 2:1 (C:S)," respectively.

20 lb/1,000 gal of P2 was prepared by adding 2.4 g of P2 to 1,000 ml of tap water. 0.2 vol. % of TMAC, 0.2 vol. % of F103 and sodium acetate buffer (to a pH of 5) were added as well. As illustrated in FIG. 2, the fluid is labeled as "CMHPG 20 #."

20 lb/1,000 gal of P1 was prepared by adding 8 ml of P1 to 1,000 ml of tap water. 0.2 vol. % of TMAC, 0.2 vol. % of F103 and sodium acetate buffer (to a pH of 5) were added as well. As illustrated in FIG. 2, the fluid is labeled as "Synthetic 20 #."

Each of the aforementioned mixtures was placed within a Fann 35 viscometer and exposed to shear rates of 300 and 600 rpms and observed over 10 minutes.

The results indicate, as depicted in FIG. 2, each of the dual-polymer 40 lb/1,000 gal mixtures, regardless of the P2:P1 ratio, experienced a higher and more sustained viscosity in comparison to the 20 lb and 40 lb single polymer fluids. This result indicates that the dual-polymer fluid, at any volumetric ratio, without added crosslinker, may exhibit and maintain adequate viscosity during the initial (minifrac) fracturing stage.

Experiment 2

Figure 3:
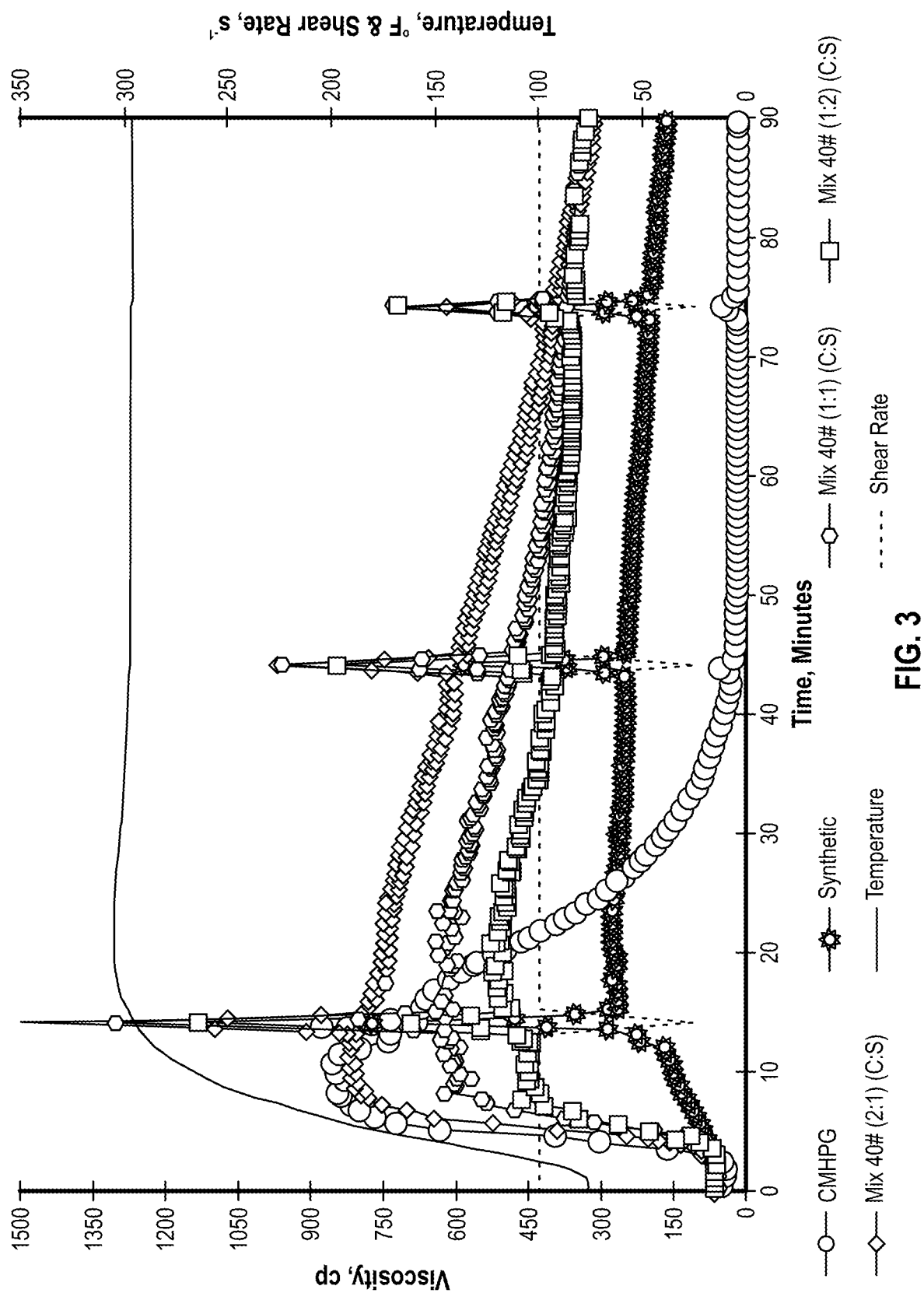
FIG. 3 is a graph depicting the viscosities of fluid mixtures, when subject to fluctuating shear rates ($s^{-1}$), comprising 40 lb/1,000 gal concentrations with pH readings of 5, according to one or more embodiments.

FIG. 3 is a graph depicting the viscosities of fluid mixtures comprising 40 lb/1,000 gal concentrations with pH readings of 5 that may employ one or more principles of the present disclosure, according to one or more embodiments. As described below, some of the fluid mixtures comprise single polymers while others comprise a dual-polymer, at varying concentrations, according to one or more embodiments. Each of the tested fluids depicted in FIG. 3 includes a crosslinker and thus FIG. 3 is representative of a fluid used in a conventional second stage hydraulic fracturing operation or similarly, indicative of a fluid capable of suspending proppant.

Fluid compositions comprising 250 ml solutions of P2 and P1 fluids were generated exactly as disclosed above in Experiment 2. Similarly, each of the three mixtures were generated in the same ratio of P2:P1 (i.e., 1:1, 1:2 and 2:1). As mentioned, in the present experiment, crosslinkers were added to each individual mixture. More particularly, in Experiment 2, Maxlink 2153 (Maxflow Oilfield Chemical Solutions® headquartered in Flemington, New Jersey), which includes Zr-lactate and propylene glycol, was added at 0.4 vol. % and mixed. As illustrated in FIG. 3, the fluid compositions are labeled as "Mix 40 # 1:1, 1:2, and 2:1 (C:S)," respectively.

40 lb/1,000 gal of P2 was prepared by adding 4.8 g to 1,000 ml of tap water; the combination was then mixed in a blender at 800-1,000 $s^{-1}$ for 20 minutes. 0.2 vol. % of TMAC (50 wt. %) and 0.2 vol. % of F103 was added to the mixture. Sodium acetate/acetic acid buffer (2 M) were added to achieve a pH of 5. The entirety of each mixture was blended thoroughly for 5 minutes. Lastly, Maxlink 2153 was added at 0.4 vol. % and mixed. As illustrated in FIG. 3, the fluid is labeled "CMHPG."

40 lb/1,000 gal of P1 was prepared by adding 16 ml (30 wt. % active concentration of SNF FLOPAAM DP/EM 5015) to 1,000 ml of tap water and mixed in a blender at 800-1,000 $s^{-1}$ for 20 minutes. 0.2 vol. % of TMAC (50 wt. %) and 0.2 vol. % of F103 was added to the mixture. Sodium acetate/acetic acid buffer (2 M) was added to achieve a pH of 5. The entirety of the mixture was blended thoroughly for 5 minutes. Lastly, Maxlink 2153 was added at 0.4 vol. % and mixed. As illustrated in FIG. 3, the fluid is labeled "Synthetic."

Each of the crosslinked fluid mixtures was placed within a HTHP (high temperature high pressure) rheometer and tested according to the same International Organization for Standardization (ISO) 13503-1 schedule and observed over a 90 minute period. (The ISO provides guidance and standardization of fluids prepared for use in the petroleum and natural gas industries.) Accordingly, each of the 40 lb/1,000 gal crosslinked fluids were mixed at 100 s$^{-1}$ (with varying decreased speeds in between), at 300° F.

The results depicted in FIG. 2 illustrate that the "Mixes" at any P2:P1 ratio, when crosslinked, outperform the individual-polymers, "CMHPG" and "Synthetic." At the initial shear rate of 100, "CMHPG" experiences the highest increase in viscosity; however, as time progresses the viscosity drops drastically. In comparison, each of the "Mixes," while they did not achieve an initial viscosity higher than the "CMHPG," they were able to sustain a more gradual loss in viscosity as the rheometer speed was varied and as time progressed. Lastly, the "Synthetic" fluid experienced the lowest initial viscosity but alternative to the "CMHPG," was able to sustain the same viscosity, albeit lower than each of the "Mixes," throughout the entirety of the testing.

Both results, illustrated in FIG. 2 (fluid compositions without crosslinkers) and FIG. 3 (fluid compositions with crosslinkers) indicate that the dual-polymer fluids (at any P2:P1 ratio) outperform the fluids comprising single polymers at any stage of the hydraulic fracturing operation. This indicates that a dual-polymer fluid may be utilized as the base fluid for every stage of the hydraulic fracturing operation.

Experiment 3

Figure 4:
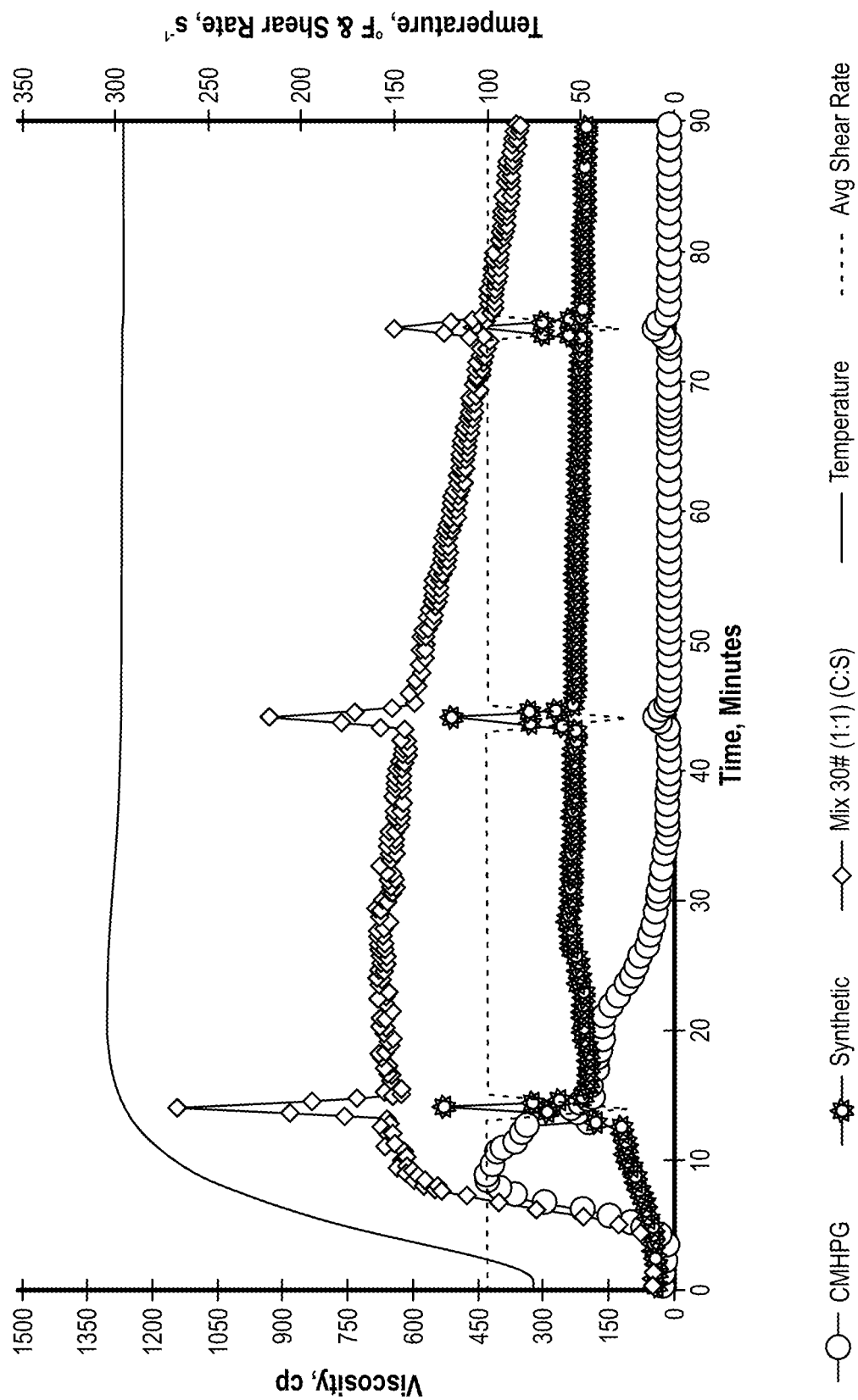
FIG. 4 is a graph depicting the viscosities of fluid mixtures, when subject to fluctuating shear rates ($s^{-1}$), comprising 30 lb/1,000 gal concentrations with pH readings of 5, according to one or more embodiments.

FIG. 4 is a graph depicting the viscosities of fluid mixtures comprising 30 lb/1,000 gal concentrations with pH readings of 5, that may employ one or more principles of the present disclosure, according to one or more embodiments. As described below, some of the fluid mixtures comprise single polymers while others comprise a dual-polymer, at varying concentrations, according to one or more embodiments. Each of the tested fluids depicted in FIG. 4 includes a crosslinker and thus FIG. 4 is representative of a fluid used in a conventional second stage of hydraulic fracturing or similarly, indicative of a fluid capable to suspend proppant. Alternative to the prior two Experiments, the loading of polymers was reduced to 30 lb/1,000 gal of the respective polymer.

30 lb/1,000 gal of P2 was prepared by adding 3.6 g to 1,000 ml of tap water, the combination was mixed in a blender at 800-1,000 shear rate (s$^{-1}$) for 20 minutes. 30 lb/1,000 gal of P1 was prepared by adding 12 ml to 1,000 ml (1.2 vol. % or 12 gpt) of tap water (wherein the active concentration of P1 was 30 wt. %), the combination was mixed in a blender at 800-1,000 (s$^{-1}$) for 20 minutes. A 250 ml final solution was prepared by mixing the two fluids in a ratio of 1:1 (CMHPG: Synthetic, by volume) using a graduated cylinder. The respective mixtures were then mixed in a blender. Once blended, 0.2 vol. % of TMAC was added along with 0.2 vol. % of F103 (surfactant). Sodium acetate buffer was added until a pH of 5 was reached. The entirety of each solution was mixed thoroughly for 5 minutes. Lastly, Maxlink 2153 was added at 0.4 vol. % and mixed. As illustrated in FIG. 4, the fluid composition is labeled as "Mix 30 # 1:1 (C:S)."

Similarly, single polymer fluid concentrations of "CMHPG" and "Synthetic" were prepared according to the same compositions as disclosed in Experiments 1 and 2, with the exception of the polymer loading. The discrete single polymer fluids each comprising 30 lb/1,000 gal of P2 and P1, respectively. 0.4 vol. % of Maxlink 2153 was added to each composition and thoroughly mixed. As illustrated in FIG. 4, P2 is labeled as "CMHPG" and P1 is labeled as "Synthetic."

Each of the crosslinked fluid mixtures was placed within the HTHP rheometer and tested according to the ISO 13503-1 schedule and observed over a 90 minute period. Each of the 30 lb/1,000 gal crosslinked fluids was mixed at 100 s$^{-1}$ (with varying decreased speeds in between), at 300° F.

The results illustrated in FIG. 4, indicate results similar to those achieved in Experiment 2 (FIG. 3). The crosslinked dual-polymer fluid outperformed the single polymer fluids ("CMHPG" and "Synthetic") even at reduced polymer loading. Observable in FIG. 4, the "Mix 30 # 1:1 (C:S)" achieves a higher initial viscosity and is better able to sustain a higher viscosity than the single polymer fluids over the duration of the observance. This indicates that a dual-polymer fluid may be utilized as the base fluid for every stage of the hydraulic fracturing operation.

Experiment 4

Figure 5:
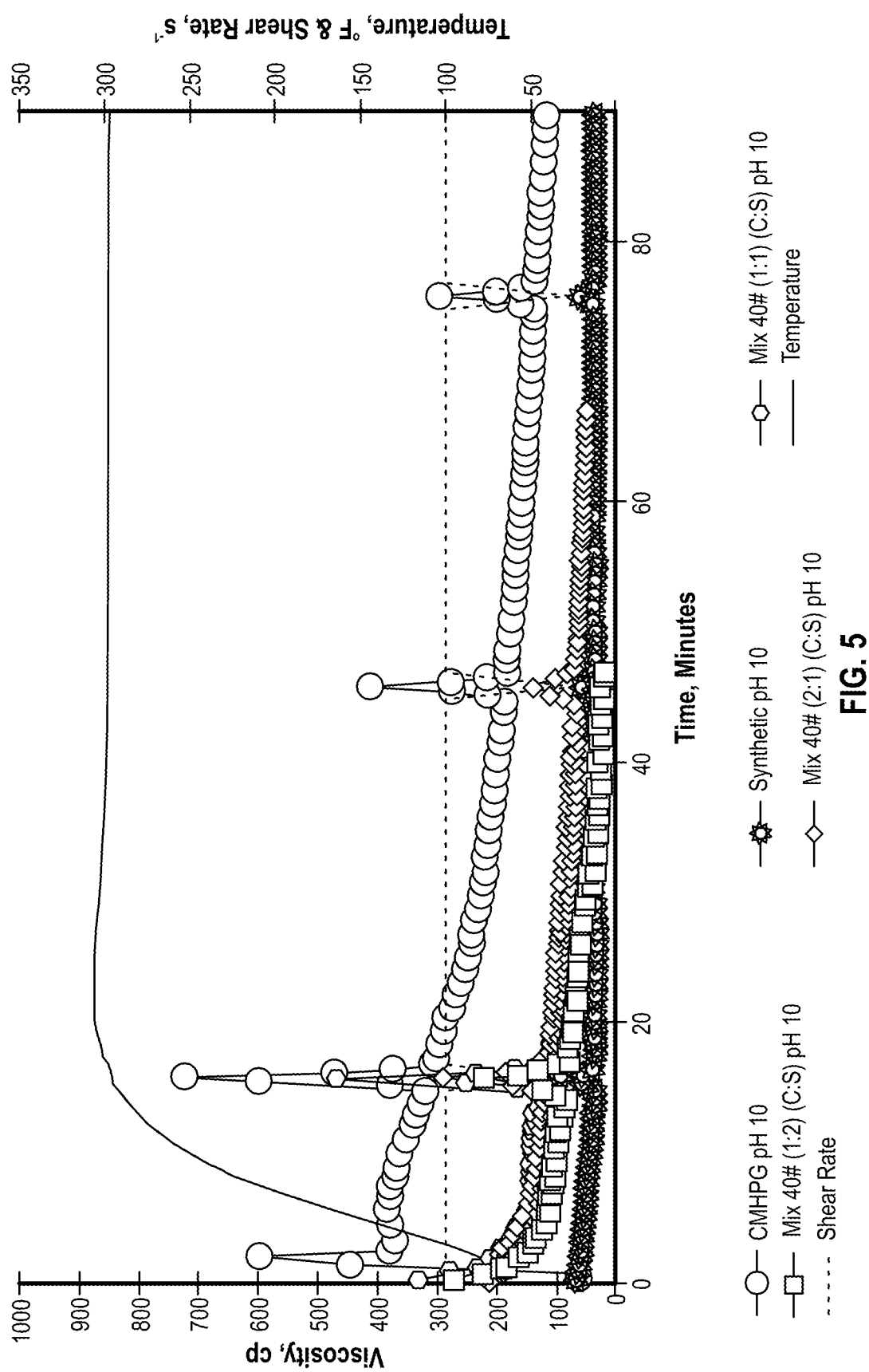
FIG. 5 is a graph depicting the viscosities of fluids comprising 40 lb/1,000 gal concentration with pH readings of 10, when subject to fluctuating shear rates ($s^{-1}$), according to one or more embodiments.

FIG. 5 is a graph depicting the viscosities of fluids comprising 40 lb/1,000 gal concentrations that may employ one or more principles of the present disclosure, according to one or more embodiments. As described below, some of the fluid mixtures comprise single polymers while others comprise a dual-polymer, at varying concentrations, according to one or more embodiments. Each of the tested fluids depicted in FIG. 4 includes a crosslinker and thus FIG. 4 is representative of fluids used in conventional second stage hydraulic fracturing or similarly, indicative of a fluid capable to suspend proppant. Alternative to the prior two Experiments, the pH of each fluid is increased to 10. Similar to the Experiments disclosed above, the graph depicts the behavior of the respective fluids at varying concentrations and viscometer speeds, according to one or more embodiments.

Fluid solutions of 250 ml comprising 40 lb/1,000 gal concentrations of P2 and P1 fluid compositions were generated in exactly the same manner as disclosed in Experiment 2. Similarly, the three mixtures were generated so that samples were prepared in ratios of P2:P1 of 1:1, 1:2 and 2:1. In addition, 0.2 vol. % of TMAC (50 wt. %), 0.2 vol. % of F103 was added to each of the mixtures. In the present Experiment, tetraethylenepentamine (TEPA) was added until the pH of each solution reached 10. The entirety of each solution was then mixed thoroughly for 5 minutes. Lastly, Maxlink 2153 was added at 0.1 vol. % and mixed. As illustrated in FIG. 4, the fluid compositions are labeled as "Mix 40 # 1:1, 1:2, and 2:1 (C:S)," respectively.

In addition and similar to Experiment 2, individual-polymer compositions were generated, each having 40 lb/1,000 gal concentrations of their respective polymer. TEPA was added until a pH of 10 was achieved in each single polymer composition. Additionally, Maxlink 2153 was added at 0.1 vol. %, to each fluid composition. As illustrated in FIG. 4, the fluid compositions are labeled as "CMHPG pH 10" and "Synthetic pH 10," respectively.

Each of the crosslinked fluid mixtures was placed within the HTHP rheometer and tested according to the ISO 13503-1 schedule and observed over a 90 minute period. Each of the 40 lb/1,000 gal crosslinked fluids was mixed at 100 s$^{-1}$ (with varying decreased speeds in between), at 300° F.

The results illustrated in FIG. 5 indicate that the mixtures ("Mix 40 # 1:1, 1:2, and 2:1 (C:S),") do not perform well at a pH of 10. Initially, the mixtures achieve a much lower viscosity in comparison to the mixtures previously observed and having a pH 5. The mixtures rapidly lose viscosity and remain significantly below the "CMHPG pH 10" fluid for the entirety of the observance. Accordingly, Experiment 4 indicates that the dual-polymer fluid, including crosslinkers, does not perform well at a pH of 10. As a result, the dual-polymer fluid (in any P2:P1 ratio) in a pH 10 environment, is not an adequate replacement for a more conventionally utilized fracture fluid (e.g., "CMHPG pH 10").

Experiment 5

Figure 6:
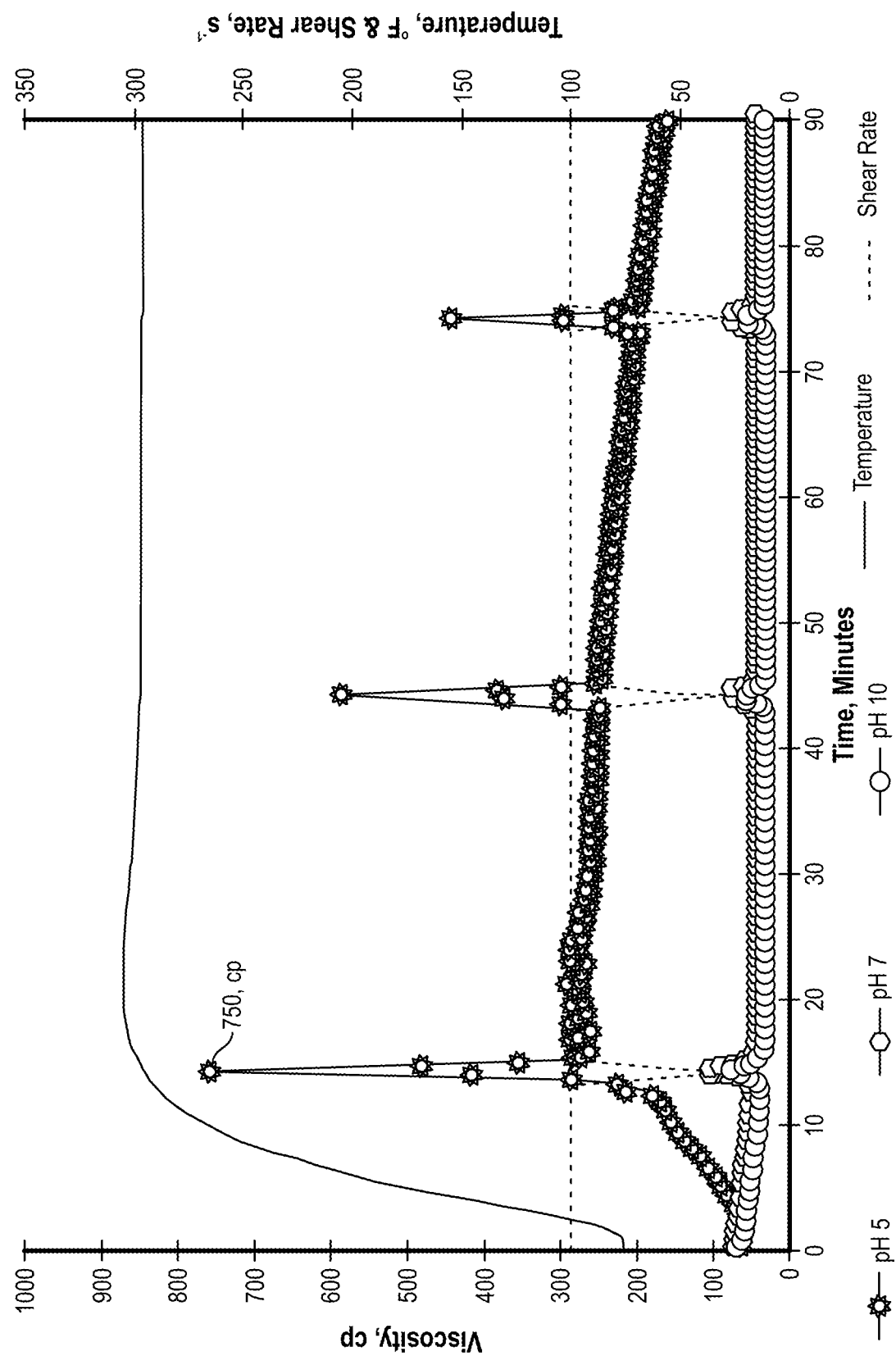
FIG. 6 is a graph depicting the effect of pH on a single synthetic (polyacrylamide) polymer fluids, when subject to fluctuating shear rates ($s^{-1}$), according to one or more embodiments.

FIG. 6 is a graph depicting the effect of pH on a single synthetic polymer fluid composition that may employ one or more principles of the present disclosure, according to one or more embodiments. The graph depicts the behavior of the respective fluids at varying concentrations and viscometer speeds, according to one or more embodiments.

40 lb/1,000 gal of P1 was prepared by adding 16 ml (30 wt. % active concentration of SNF FLOPAAM DP/EM 5015) to 1,000 ml of tap water, the combination was mixed in a blender at 800-1,000 $s^{-1}$ for 20 minutes. 0.2 vol. % of TMAC (50 wt. %), 0.2 vol. % of F103, and tetraethylenepentamine (TEPA) was added to achieve a pH of 10. The entirety of the mixture was blended thoroughly for 5 minutes. Lastly, Maxlink 2153 was added at 0.4 vol. % and mixed. As illustrated in FIG. 6, the fluid is labeled "pH 10."

40 lb/1,000 gal of P1 was prepared by adding 16 ml (30 wt. % active concentration of SNF FLOPAAM DP/EM 5015) to 1,000 ml of tap water, the combination was mixed in a blender at 800-1,000 $s^{-1}$ for 20 minutes. 0.2 vol. % of TMAC (50 wt. %), 0.2 wt. vol. % of F103, and sodium acetate/acetic acid buffer (2 M) was added to achieve a pH of 5. The entirety of the mixture was blended thoroughly for 5 minutes. Lastly, Maxlink 2153 was added at 0.4 vol. % and mixed. As illustrated in FIG. 6, the fluid is labeled "pH 5."

40 lb/1,000 gal of P1 was prepared by adding 16 ml (30 wt. % active concentration of SNF FLOPAAM DP/EM 5015) to 1,000 ml of tap water, the combination was mixed in a blender at 800-1,000 $s^{-1}$ for 20 minutes. 0.2 vol. % of TMAC (50 wt. %) and 0.2 vol. % of F103 was added to the solution. In the present P1 fluid composition, the pH was held at a neutral level of 7. The entirety of the mixture was blended thoroughly for 5 minutes. Lastly, Maxlink 2153 was added at 0.4 vol. % and mixed. As illustrated in FIG. 6, the fluid is labeled "pH 7."

Each of the mixtures was placed within a HTHP rheometer and mixed according to the same ISO 13503-1 schedule, at 300° F.

The results illustrated in FIG. 6, indicate that individual synthetic polymers having a pH of 7 or 10, are incapable of crosslinking to generate increased viscosities (e.g., >150 cp). Alternatively, however, the single synthetic polymer having a pH of 5, is capable of crosslinking and maintaining some viscosity over time. Thus, a single synthetic polymer may be utilized as a fracture fluid with proppant carrying capacity in an environment comprising a pH of 5.

Experiment 6

Figure 7:
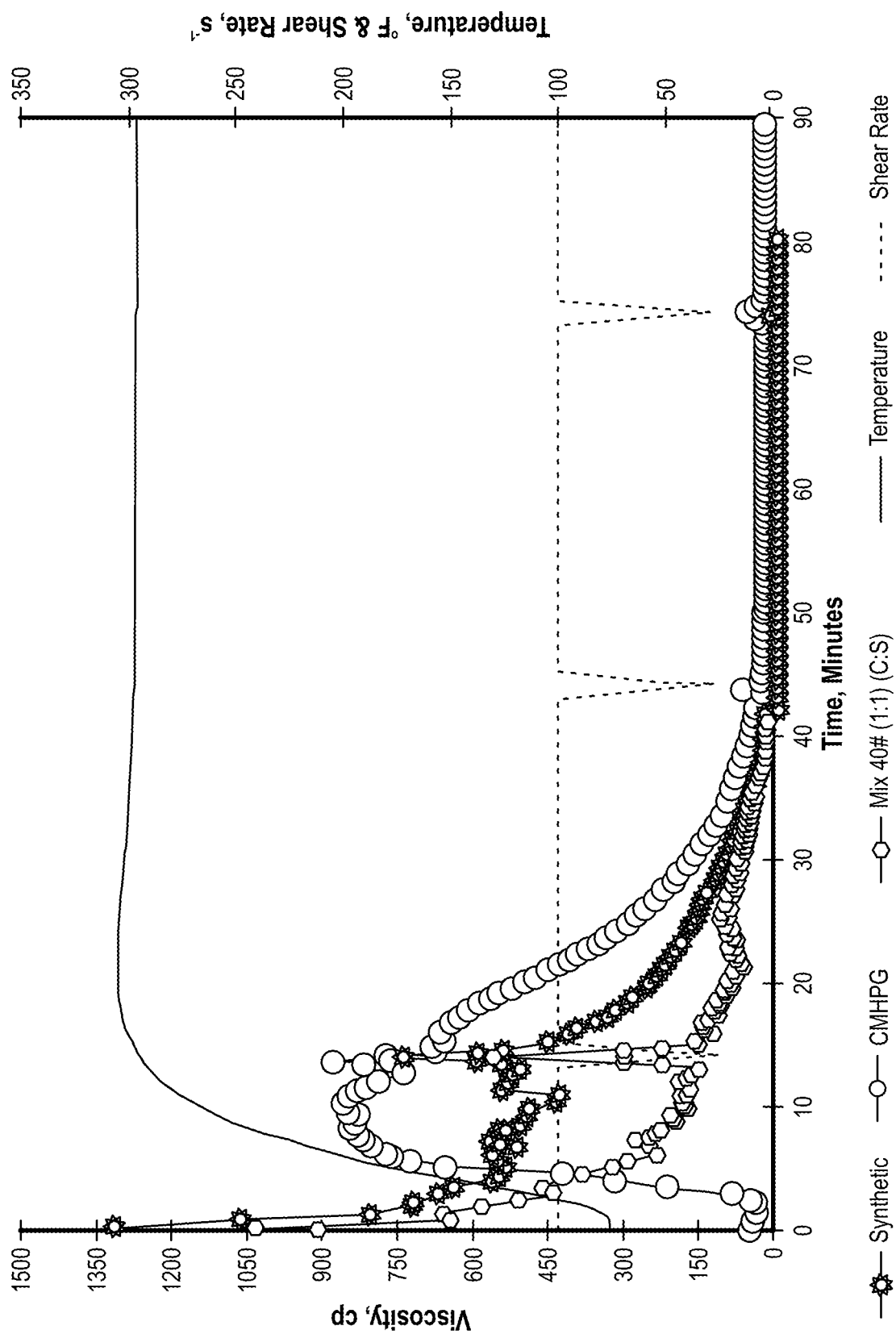
FIG. 7 is a graph depicting the effect of utilizing a polyacrylamide comprising differing monomers, when subject to fluctuating shear rates ($s^{-1}$), according to one or more embodiments.

FIG. 7 is a graph depicting the effect of utilizing a polyacrylamide (P1) that comprises differing monomers than disclosed in the previous Experiments that may employ one or more principles of the present disclosure, according to one or more embodiments. The graph depicts the behavior of the respective fluids at varying concentrations and viscometer speeds, according to one or more embodiments.

40 lb/1,000 gal of P2 was prepared by adding 4.8 g to 1,000 ml of tap water, the combination was mixed in a blender at 800-1,000 $s^{-1}$ for 20 minutes. In the present Experiment, 40 lb/1,000 gal of synthetic polymer was prepared by adding 12 ml (40% active concentration of ALCOMER 120L from BASF® headquartered in Germany) to 1,000 ml of tap water and mixed in a blender at 800-1,000 $s^{-1}$ for 20 minutes. (ALCOMER 120L comprises only AM-AA.) A 250 ml final solution was prepared by mixing the two fluids in a ratio of 1:1 (P2:P1, by volume) using a graduated cylinder. The final solution was mixed thoroughly in a blender. 0.2 vol. % of TMAC (50 wt. %) and 0.2 vol. % of F103 was added to the solution. Sodium acetate/acetic acid buffer (2 M) was added until a pH of 5 was reached. The entirety of the mixture was blended thoroughly for 5 minutes. Lastly, Maxlink 2153 was added at 0.4 vol. % and mixed. As illustrated in FIG. 7, the fluid mixture is labeled "Mix 40 # 1:1 (C:S)."

Like the single polymer P2 disclosed in previous Experiments, 40 lb/1,000 gal of CMHPG was prepared. 0.2 vol. % of TMAC (50 wt. %) and 0.2 vol. % of F103 was added to the solution. Sodium acetate/acetic acid buffer (2 M) was added until the fluid reached a pH 5. Maxlink 2153 was added at 0.4 vol. % and mixed. As illustrated in FIG. 7, the fluid is labeled "CMHPG."

40 lb/1,000 gal of synthetic polymer was prepared by adding 12 ml (40% active concentration of ALCOMER 120L from BASF) to 1,000 ml of tap water, the combination mixed in a blender at 800-1,000 ($s^{-1}$) for 20 minutes. 0.2 vol. % of TMAC (50 wt. %) was added, 0.2 vol. % of F103 was also added. Sodium acetate/acetic acid buffer (2 M) was added until pH reached 5. The P1 fluid composition was mixed thoroughly for 5 minutes. Lastly, Maxlink 2153 was added at 0.4 vol. % and mixed. As illustrated in FIG. 7, the fluid is labeled "Synthetic."

Each of the mixtures was placed within a HTHP rheometer and mixed according to the same ISO 13503-1 schedule, at 300° F.

The results illustrated in FIG. 7, indicate that a synthetic polymer (P1) that does not contain any AMPS, experiences no delay in crosslinking. The viscosity of the fluid composition builds quickly and similarly degrades/loses viscosity quickly. The results also indicate when the P1 lacking AMPS is mixed with the P2, creating a dual-polymer fluid, (i.e., "Mix 40 # 1:1 (C:S)") the mixture underperforms the single polymer fluids. Accordingly, a synthetic polymer (P1) comprising AMP may be used, and is most advantageous to achieve a dual-polymer base fluid capable of maintaining viscosity through the minifrac of the operation and into the fracturing stages.

Experiment 7

Figure 8:
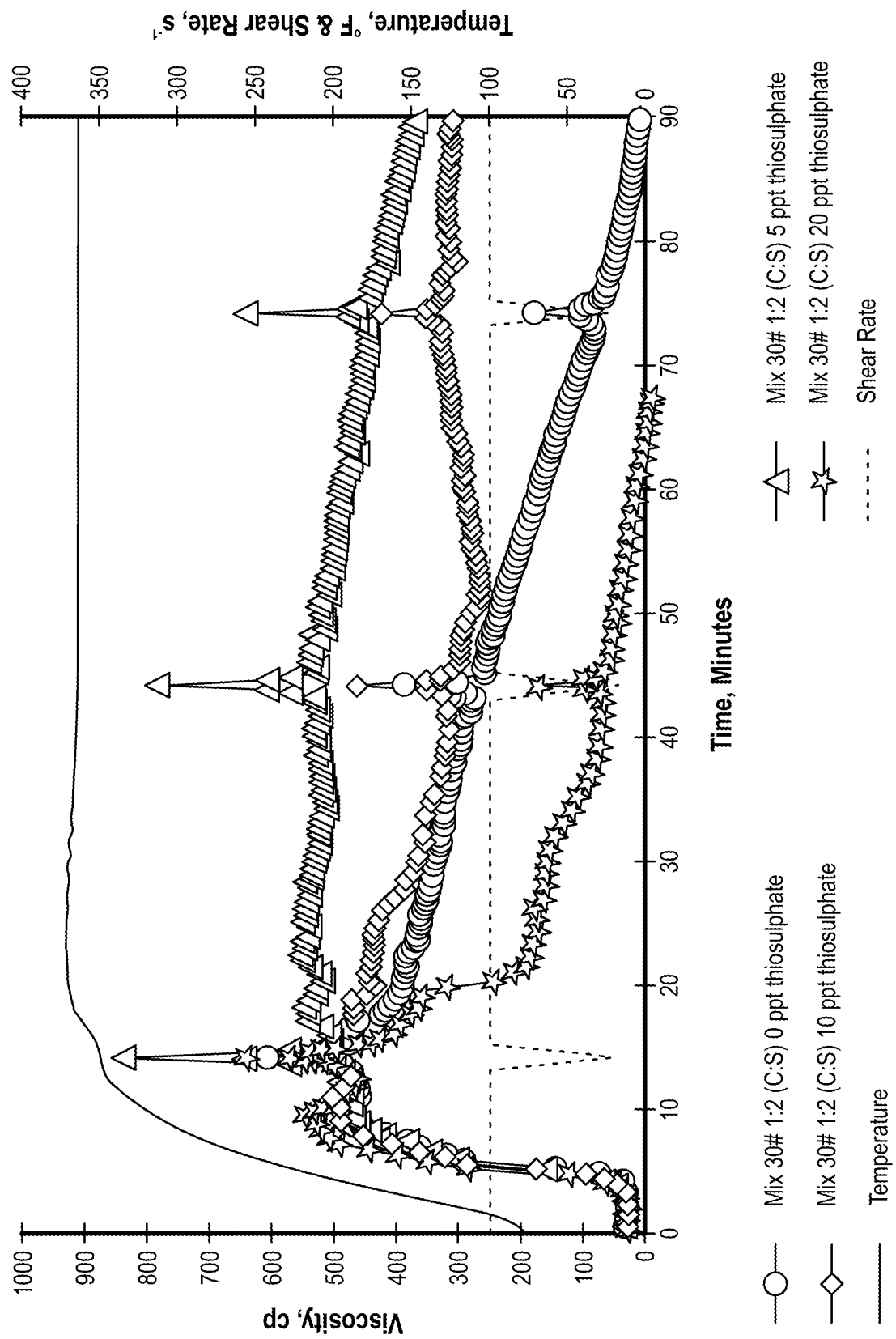
FIG. 8 is a graph depicting the effect of increased temperature on the viscosity of fluid mixtures comprising 30 lb/1,000 gal concentrations including a sodium thiosulfate pentahydrate salt, at fluctuating shear rates ($s^{-1}$), with pH readings of 5, according to one or more embodiments.

FIG. 8 is a graph depicting the effect of increased temperature on the viscosity of fluid mixtures including a sodium thiosulfate pentahydrate salt, and comprising fluid concentrations previously disclosed in the prior Experiments, that may employ one or more principles of the present disclosure, according to one or more embodiments.

Fluid solutions of 250 ml comprising 30 lb/1,000 gal concentrations of P2 and P1 fluid compositions were generated in exactly the same manner as disclosed in Experiment 3. However, in the present Experiment 7, the mixture was generated so that fluid was prepared only in a 1:2 ratio of P2:P1. 0.2 vol. % of TMAC (50 wt. %), 0.2 vol. % of F103 was also added to the mixture. Sodium acetate/acetic acid buffer (2 M) was added until the pH of the composition reached 5. The entirety of each solution was then mixed thoroughly for 5 minutes. The resultant solution was divided into four discrete samples so that specific concentrations of sodium thiosulfate pentahydrate salt could be added to each respective solution. Accordingly, concentrations equating to 0.06 wt. %, 0.12 wt. %, and 0.24 wt. % were added. Lastly, Maxlink 2153 of 0.6 vol. % was added to three of the fluid compositions and then mixed. As illustrated in FIG. 8, the fluid compositions are labeled as "Mix 30 # 1:2, 0 ppt thiosulfate," "Mix 30 # 1:2, 5 ppt thiosulfate," "Mix 30 # 1:2, 10 ppt thiosulfate," and "Mix 30 # 1:2, 20 ppt thiosulfate," respectively.

Each of the mixtures was placed within a HTHP rheometer and mixed according to the same ISO 13503-1 schedule, at 370° F.

The results illustrated in FIG. 8, indicate that the base fluid ("Mix 30 # 1:2, 0 ppt thiosulfate") is incapable of maintaining viscosity when exposed to a temperature of at least 370° F. The results further indicate that 5 ppt (0.06 wt. %) and or 10 ppt (0.12%) thiosulfate may be added to increase viscosity to greater than 150 cp at 100 s$^{-1}$. However, the results further illustrate that a concentration of 20 ppt of thiosulfate is unstable at a temperature of 370° F. Accordingly, a thiosulfate concentration of some amount greater than 0.0 wt. % but less than 0.12 wt. % may be beneficial in maintaining a stable viscosity at temperatures greater than 350° F.

Experiment 8

Figure 9:
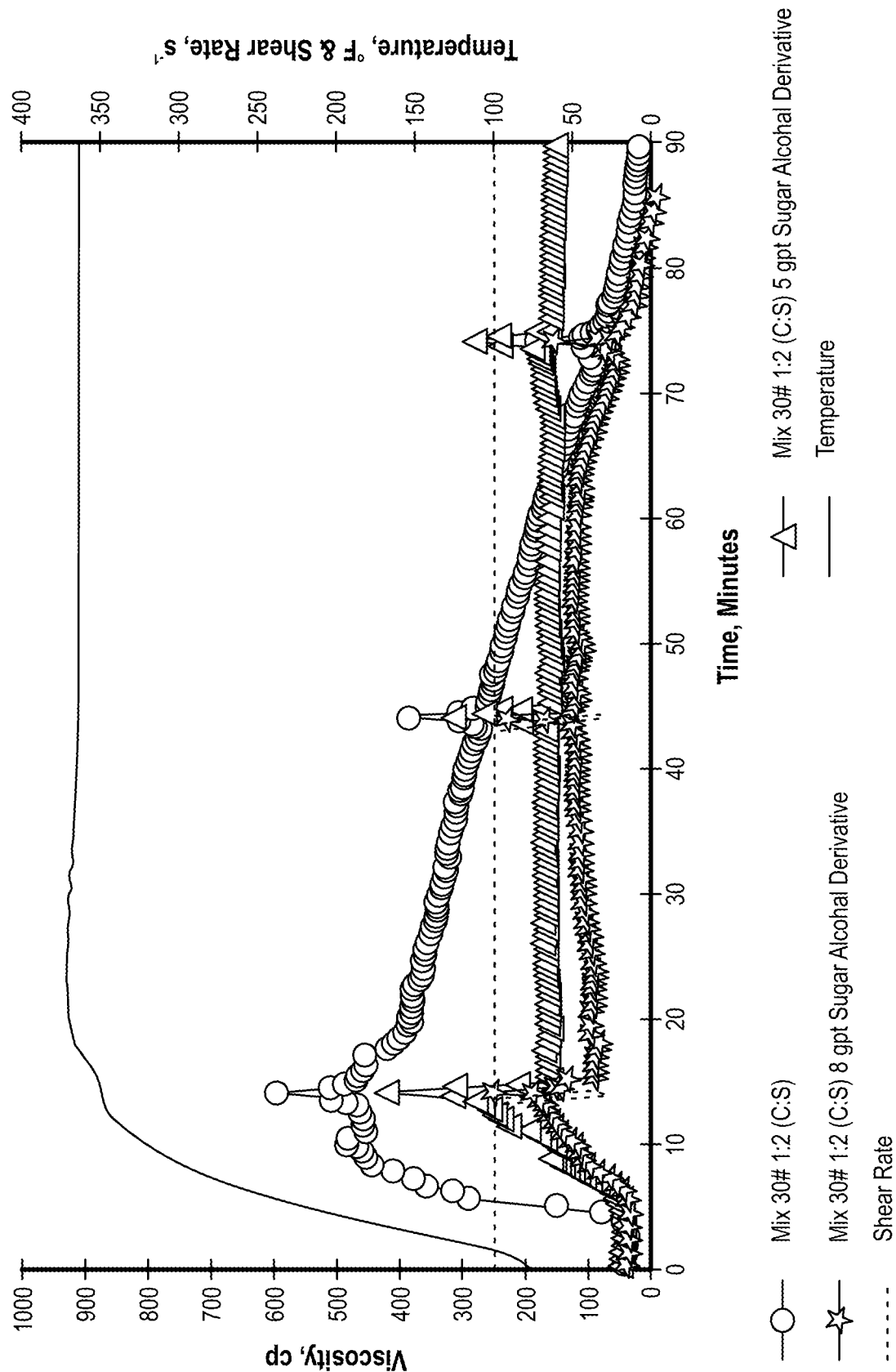
FIG. 9 is a graph depicting the effect of increased temperature on the viscosity of fluid mixtures comprising 30 lb/1,000 gal concentrations including a sugar alcohol derivative, at fluctuating shear rates ($s^{-1}$), with pH readings of 5, according to one or more embodiments.

FIG. 9 is a graph further depicting the effect of increased temperature upon the fluids in concentrations previously disclosed in the prior Experiments, that may employ one or more principles of the present disclosure, according to one or more embodiments. The graph depicts the behavior of the respective fluids at varying viscometer speeds, according to one or more embodiments.

Fluid solutions of 250 ml comprising 30 lb/1,000 gal concentrations of P2 and P1 fluid compositions were generated in exactly the same manner as disclosed in Experiments 3 and 7. Like Experiment 7, the mixture was generated so that the fluid was prepared in a 1:2 ratio of P2:P1. 0.2 vol. % of TMAC (50 wt. %) and 0.2 vol. % of F103 were added. Sodium acetate/acetic acid buffer (2 M) was added until the pH reached 5. The entirety of each solution was mixed thoroughly for 5 minutes. The solution was divided into discrete samples so that specific concentrations of sugar alcohol derivative could be added to each respective solution. More particularly, concentrations of 0.5 vol. % and 0.8 vol. % of Ethox 3571® (Ethox Chemicals, LLC headquartered in Greenville, SC) were added. Lastly, Maxlink 2153 was added to each of the fluid compositions in a concentration of 0.6 vol. % and then mixed. As illustrated in FIG. 8, the fluid composition comprising 0 sugar alcohol derivative is labeled as "Mix 30 # 1:2 (C:S)." The fluid compositions containing the sugar alcohol derivative are labeled "Mix 30 # 1:2 (C:S) 5 gpt Sugar Alcohol Derivative" and "Mix 30 # 1:2 (C:S) 8 gpt Sugar Alcohol Derivate," respectively.

Each fluid was emplaced within a HTHP rheometer and mixed according to the same ISO 13503-1 schedule previously mentioned, at 370° F.

The results illustrated in FIG. 9, indicate that the base fluid ("Mix 30 # 1:2 (C:S)") with 0.0 vol. % sugar alcohol derivative is incapable of maintaining a stable viscosity at or about 150 cp when exposed to a temperature of at least 370° F. The results further indicate that with the addition of 8 gpt of sugar alcohol derivative, the fluid cannot maintain a stable viscosity above 150 cp. While the "Mix 30 # 1:2 (C:S) 8 gpt Sugar Alcohol Derivate" fluid, when crosslinked, can achieve a viscosity greater than 150 cp, the viscosity quickly drops off. In the alternative, the addition of 5 gpt sugar alcohol derivative achieves better results. As illustrated in FIG. 9, the base fluid with 5 gpt concentration is able to maintain a stable 150 cp viscosity for the duration of the 90 minute observation. Accordingly, a sugar alcohol derivative of at least 0.5 vol. % (5 gpt), and/or greater than 0.0 vol. %, may be advantageous in producing a fluid capable of achieving and maintaining a stable viscosity at or around 150 cp and thus may be suitable as a base fluid for all stages of the hydraulic fracturing treatment.

Figure 10:
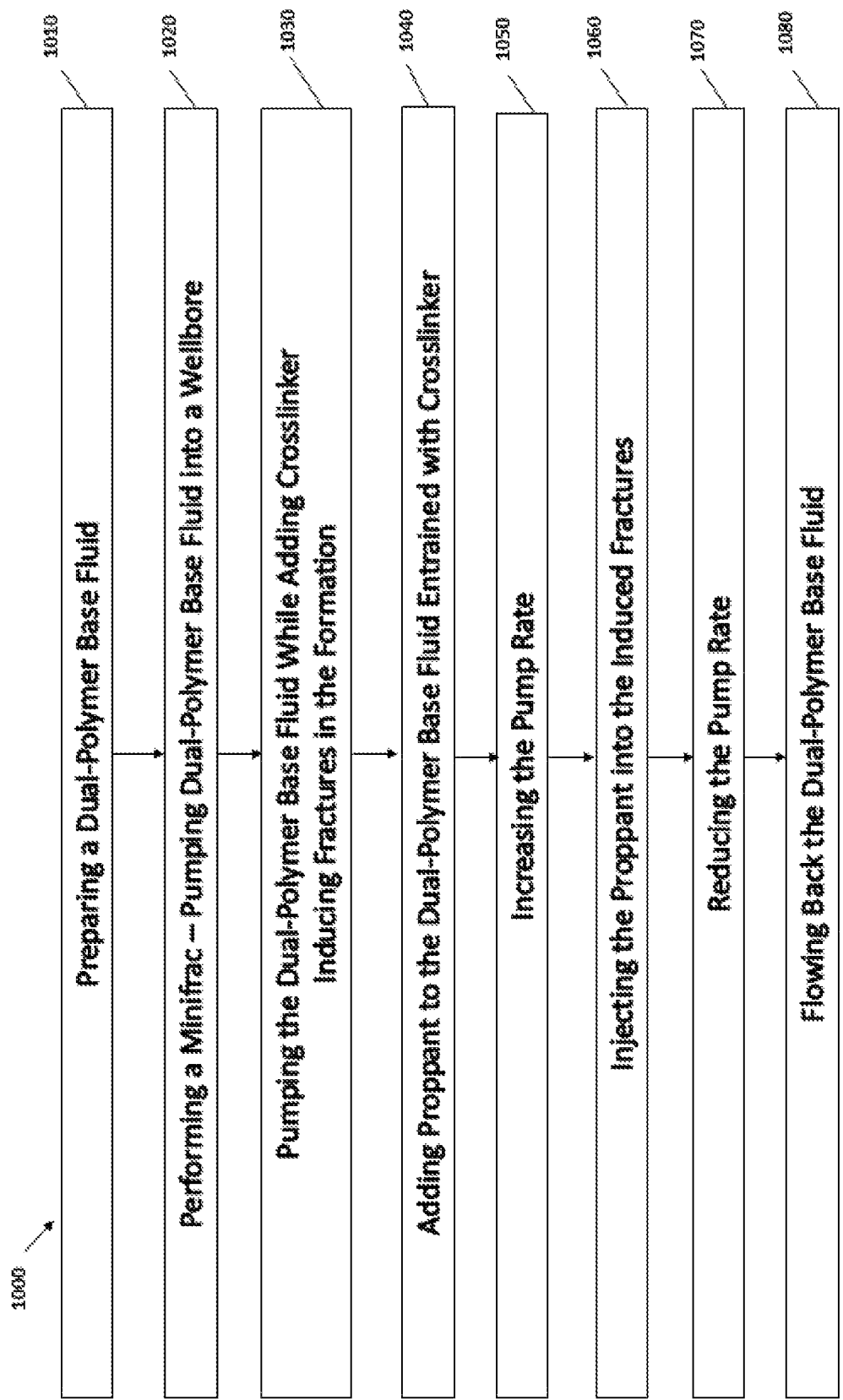
FIG. 10 is a schematic flowchart of an example wellbore stimulation operation method, according to one or more embodiments.

FIG. 10 is a schematic flowchart of an example wellbore stimulation operation method 1000 that may employ one or more principles of the present disclosure, according to one or more embodiments. As illustrated, the method 1000 may include preparing a dual-polymer base fluid, as 1010. The dual-polymer base fluid may comprise a polyacrylamide and a polysaccharide. Due to the need to achieve and maintain a stable viscosity throughout the entirety of the wellbore stimulation operation method, the polyacrylamide polymer may be comprised with monomers including: acrylamide (AM), acrylic acid (AA) and 2-acrylamido-2-methylpropane sulfonic acid (AMPS). An acidic buffer may be added to regulate the pH of the base fluid between 4 and 6. The method 1000 may then include performing a minifrac by pumping the dual-polymer base fluid into the wellbore 106 (FIG. 1), as at 1020. Those of ordinary skill in the art will be familiar with the steps of performing a mini-frac. In one embodiment, the minifrac may include initiating a fracture using a non-crosslinked fluid, conducting a step up rate test and then conducting a step down rate test, following which, the pumping may be stopped and the wellbore may be shut in so that the decline in pressure may be observed over time. Once adequate time to monitor has passed, the wellbore may be opened back up to circulation and the non-crosslinked fluid may be flowed back. The observed data may then be utilized to potentially refine or re-design the subsequent fracturing (treatment) stage(s). Following the minifrac, a temperature log (via wireline log or otherwise) may be run by conveying a downhole tool operable to record temperature into the wellbore. A temperature log may be beneficial in refining and redesigning the pumping schedule. The method 1000, may also include pumping the dual-polymer base fluid at a high flow rate while simultaneously adding a crosslinker to the circulating system, as at 1030. The crosslinker may comprise metallic crosslinkers as disclosed previously herein. The high flow rate flow of the dual-polymer fluid with increased viscosity may initiate desired fractures within the formation. A sample of the dual-polymer base fluid mixed with the crosslinker may be acquired to ensure the characteristics of the mixture are adequate for proppant placement. Characteristics that may be observed include but are not limited to, vortex closure rate, closure pressure, proppant carrying capacity, pH, and similar. Upon deeming the crosslinked dual polymer fluid adequate, or in the alternative, after making adjustments to the base fluid, the method 1000, may continue with the addition of proppant, as at 1040. Proppant may be added to the circulating system while gradually increasing the flow rate of the fluid, i.e., increasing the pump rate, as at 1050. The proppant may then enter, or similarly, be injected into the initiated fractures, as at 1060. The proppant may comprise a particulate appropriate for the formation matrix in which it will be deployed.

The method 1000 may continue by reducing the pump pressure, as at 1070. Reducing the pump pressure allows the initiated fractures to relax while the proppant simultaneously keeps the fractures open. Lastly, the method 1000, may include flowing back the dual polymer crosslinked fluid wherein the fluid is circulated back to the wellbore surface for recovery, as at 1080. In some embodiments, the aforementioned method 1000 may be performed in several discrete sections of the wellbore and similarly, may be performed in phases. In other embodiments, the method 1000 steps disclosed above may be completed in a varying order without departing from the scope of this disclosure.

The terminology used herein is for the purpose of describing particular embodiments only and is not intended to be limiting of the invention. As used herein, for Experiment, the singular forms "a," "an," and "the" are intended to include the plural forms as well, unless the context clearly indicates otherwise. It will be further understood that the terms "contains", "containing", "includes", "including." "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method of single-stage hydraulic fracturing, comprising:
    preparing a dual-polymer base fluid including:
        a polysaccharide polymer; and
        a polyacrylamide polymer;
    pumping the dual-polymer base fluid into a wellbore drilled into a formation using one or more pumps;
    performing a minifrac operation upon the formation at a first pump rate using the dual-polymer base fluid in an uncrosslinked state;
    conveying a downhole tool operable to record temperature data into the wellbore after performing the minifrac operation;
    retrieving the downhole tool from the wellbore;
    after retrieving the downhole tool, adding a crosslinker to the dual-polymer base fluid while simultaneously pumping the dual-polymer base fluid into the wellbore at a second pump rate higher than the first pump rate, thereby forming a crosslinked polymer in the wellbore;
    inducing one or more fractures in the formation at the second pump rate;
    adding proppant to the dual-polymer base fluid while simultaneously pumping the dual-polymer base fluid into the wellbore at the second pump rate;
    injecting the proppant into the one or more fractures at the second pump rate;
    reducing a pump pressure of the one or more pumps below the second pump rate; and
    after reducing pump pressure below the second pump rate, flowing the dual-polymer base fluid back into the wellbore for recovery thereof.

2. The method of claim 1, wherein the dual-polymer base fluid further includes:
    a clay stabilizer;
    a buffer; and
    a temperature stabilizer.

3. The method of hydraulic fracturing of claim 1, further comprising:
    acquiring a sample of the dual-polymer base fluid; and
    ensuring one or more characteristics of the dual-polymer base fluid containing the crosslinker is adequate to position the proppant.

4. The method of claim 1, wherein the polysaccharide polymer is selected from the group consisting of a carboxymethyl hydroxypropyl guar (CMHPG), a hydroxypropyl guar (HPG), a guar, a polysaccharide derivative having six or more repeating units, a polysaccharide containing a side group capable of hydrogen bonding, and any combination thereof.

5. The method of claim 1, wherein the polyacrylamide polymer comprises the following monomers: acrylamide (AM), acrylic acid (AA), and 2-acrylamido-2-methylpropane sulfonic acid (AMPS).

6. The method of claim 1, wherein a ratio of polysaccharide polymer to polyacrylamide polymer is 1:1 to 2:1.

7. The method of claim 5, wherein the polyacrylamide polymer comprises 10-30 wt. % AMPS, 0.5-2.0 wt. % AA, and a remainder of the polyacrylamide polymer comprises AM.

8. The method of claim 1, wherein a pH of the dual-polymer base fluid ranges from 4 to 6.

9. The method of claim 1, wherein the dual-polymer base fluid further comprises one or more of the following:
    0.1 vol. %-1.0 vol. % clay stabilizer;
    0.05 vol. %-1.0 vol. % surfactant;
    0.06 wt. %-1 wt. % temperature stabilizer; or
    0.01 vol. %-2 vol. % metallic crosslinker.

10. The method of claim 9, wherein:
    the clay stabilizer is selected from the group consisting of tetramethyl ammonium chloride (TMAC), potassium chloride (KCl), a polymeric-based clay stabilizer, a salt-based clay stabilizer, and any combination thereof; wherein the salt-based clay stabilizer is selected from the group consisting of ammonium chloride, sodium chloride, choline chloride, and any combination thereof;
    the temperature stabilizer is selected from the group consisting of sodium thiosulfate pentahydrate, ascorbic acid, an ethoxylated sugar alcohol derivative, and any combination thereof; and
    the metallic crosslinker is selected from the group consisting of zirconium lactate, zirconium lactate and triethanolamine, zirconium triethanolamine lactate, zirconium lactate and propylene glycol, a titanium based crosslinker, a hafnium based crosslinker, an aluminum based crosslinker, and any combination thereof.

11. The method of claim 1, wherein performing the minifrac operation at the first pump rate comprises:
   initiating a first fracture;
   conducting a step rate test;
   stopping the one or more pumps;
   shutting in the wellbore for a time period; and
   opening the wellbore after the time period.

* * * * *